US012611706B2

(12) United States Patent
Henriksson et al.

(10) Patent No.: US 12,611,706 B2
(45) Date of Patent: Apr. 28, 2026

(54) METHODS OF MATERIAL FORMING AND/OR CUTTING

(71) Applicant: Cell Impact AB, Karlskoga (SE)

(72) Inventors: Erika Henriksson, Skoghall (SE); Jon Nieminen, Kristinehamn (SE)

(73) Assignee: Cell Impact AB, Karlskoga (SE)

(*) Notice: Subject to any disclaimer, the term of this patent is extended or adjusted under 35 U.S.C. 154(b) by 936 days.

(21) Appl. No.: 17/272,257

(22) PCT Filed: Sep. 26, 2019

(86) PCT No.: PCT/EP2019/076037

§ 371 (c)(1),
(2) Date: Feb. 26, 2021

(87) PCT Pub. No.: WO2020/064931

PCT Pub. Date: Apr. 2, 2020

(65) Prior Publication Data

US 2022/0371072 A1 Nov. 24, 2022

(30) Foreign Application Priority Data

Sep. 28, 2018 (SE) .................................... 1851166-7
Feb. 15, 2019 (SE) .................................... 1950181-6

(51) Int. Cl.

| | |
|---|---|
| ***B21J 7/28*** | (2006.01) |
| ***B21D 22/02*** | (2006.01) |
| ***B21D 28/00*** | (2006.01) |
| ***B21J 7/04*** | (2006.01) |
| ***B21J 7/30*** | (2006.01) |
| ***B30B 1/32*** | (2006.01) |

(52) U.S. Cl.

CPC ........... *B21D 28/002* (2013.01); *B21D 22/02* (2013.01); *B21J 7/04* (2013.01); *B21J 7/28* (2013.01); *B21J 7/30* (2013.01); *B30B 1/32* (2013.01)

(58) Field of Classification Search

CPC ......... B21J 9/10; B21J 9/12; B21J 7/28; B21J 7/40; B21J 7/04; B21D 28/002

See application file for complete search history.

(56) References Cited

U.S. PATENT DOCUMENTS 4,844,661 A 7/1989 Martin et al.
2017/0136522 A1* 5/2017 Ivarson .................... B21J 13/06

(Continued)

FOREIGN PATENT DOCUMENTS

CN 105328099 A 2/2016
CN 106457357 A 2/2017

(Continued)

OTHER PUBLICATIONS

International Search Report Issued in International Patent Application No. PCT/EP2019/076037 on Mar. 13, 2020, 2 pages.

(Continued)

*Primary Examiner* — Debra M Sullivan
(74) *Attorney, Agent, or Firm* — Schott, P.C.

(57) ABSTRACT

A method for material forming and/or cutting by means of a tool and a drive unit. The method includes moving the drive unit to provide kinetic energy to the tool, for the tool to strike a work material, so as to form and/or cut the work material when the tool is operatively disassociated from the drive unit before the tool strikes the work material.

12 Claims, 3 Drawing Sheets

(56) References Cited

U.S. PATENT DOCUMENTS

| | | | |
|---|---|---|---|
| 2018/0085820 | A1 | 3/2018 | Otto |
| 2020/0180010 | A1 | 6/2020 | Ivarson et al. |

FOREIGN PATENT DOCUMENTS

| | | | |
|---|---|---|---|
| CN | 107570648 | A | 1/2018 |
| EP | 3122491 | A1 | 2/2017 |
| JP | H06344052 | A | 12/1994 |
| JP | 2017509490 | A | 4/2017 |
| KR | 101462561 | B1 | 11/2014 |

OTHER PUBLICATIONS

International Preliminary Report on Patentability issued in the International Patent Application No. PCT/EP2019/076037 on Jan. 25, 2021, 6 Pages.

* cited by examiner

METHODS OF MATERIAL FORMING AND/OR CUTTING

TECHNICAL FIELD

The invention relates to a method for material forming and/or cutting. The invention also relates to a computer program, a computer readable medium, a control unit, and an apparatus for material forming and/or cutting.

BACKGROUND

The invention is advantageously used for High velocity forming (HVF) and/or cutting, but may according to other embodiments of the invention be used for material forming and/or cutting involving other velocities than used for HVF. HVF is herein also referred to as High velocity material forming. HVF of metals is also known as High velocity metal forming. High velocity cutting or high-speed cutting may also be called high-speed crosscutting or high velocity crosscutting.

In conventional metal forming operations, a force is applied to the metal to be worked upon, by using simple hammer blow or a power press; the heavy tools used are moved at a relatively low velocity. Conventional techniques include methods such as Forging, Extrusion, Drawing, and Punching, etc. In conventional metal cutting operations, there many technologies available to cut metal, including machine technologies such as turning, milling, drilling, grinding, sawing. Among other technologies, there are also welding/burning technologies, such as burning by laser, oxy-fuel burning, and plasma.

CN107570648 describes a forging machine, in which a forging hammer is lifted with a motor and released to fall towards a die. An electromagnetic force is added to strengthen the forging force, and to fix the die on a forging cutting board.

U.S. Pat. No. 4,844,661A relates to piling with a free-falling hammer.

HVF involves imparting a high kinetic energy to a tool, by giving it to a highly velocity, before it is made to hit a work piece. HVF includes methods such as hydraulic forming, explosive forming, electro hydraulic forming, and electro-magnetic forming, for example by means of an electric motor. In these forming processes a large amount of energy is applied to the work piece during a very short interval of time. The velocities of HVF may typically be at least 1 m/s, preferably at least 3 m/s, preferably at least 5 m/s. For example, the velocities of HVF may be 1-20 m/s, preferably, 3-15 m/s, preferably 5-15 m/s. HVF may be regarded as a process in which the material shaping forces are obtained from kinetic energy, whereas, in conventional material forming, the material forming forces are obtained from pressure, e.g. hydraulic pressure.

Similarly, as in HVF, high velocity cutting involves imparting a high kinetic energy to a cutting tool, by giving it a highly velocity, before it is made to hit and cut a work piece. The velocities of high velocity cutting may typically be at least 1 m/s, preferably at least 3 m/s, preferably at least 5 m/s. For example, the velocities of high velocity cutting may be 1-20 m/s, preferably, 3-15 m/s, preferably 5-15 m/s.

An advantage of HVF is provided by the fact that many metals tend to deform more readily under a very fast application of a load. The strain distribution is much more uniform in a single operation of HVF as compared to conventional forming techniques. This results in making it easy to produce complex shapes without inducing unnecessary strains in the material. This allows forming of complex parts with close tolerances, and forming of alloys that might not be formable by conventional metal forming. For example, HVF may be used in the manufacturing of metal flow plates used in fuel cells. Such manufacturing requires small tolerances.

An advantage with high velocity cutting is that more efficient and simple methods in production-engineering terms can be used to obtain high measuring accuracy. Further, the time between strokes of the cutting tool can be made extremely short, resulting in a high production rate.

Another advantage with HVF and high velocity cutting is that, while the kinetic energy a tool is linearly proportional to the mass of the tool, it is squarely proportional to the velocity of the tool, and therefore, compared to conventional metal forming, considerably lighter tools may be used in HVF.

It is known, in HVF and high velocity cutting, to allow a plunger to be driven from a start position by a hydraulic pressure in a first chamber, in order to transfer, by a stroke, a high kinetic energy to a tool, which in turn processes a work material, e.g. a workpiece. To avoid excessive deformation in the tool at the strike from the plunger, the tool has to possess a relatively high stiffness, and thereby a relatively high mass. As a result, the system for driving the plunger needs to present a high capacity. Further, due to high kinetic energy, the plunger may strike the tool more than one time. This may happen if the work material rebound because of deformation at the strike by the tool and as consequence, the work material strikes in turn the tool thereby pushing the tool towards and in contact again with the plunger. This is an undesirable action. The plunger should only hit the tool once, otherwise the forming and/or cutting of the workpiece may result in impaired properties of the end product, such as weakening and unevenness, or even failure in the production.

EP3122491A1 relates to avoiding, in HVF, that a piston strikes the tool more than one time. A first chamber is pressurized to drive the piston towards a tool. A pressure in a second chamber provides a force for a return movement of the piston. The piston has a smaller exposed area to the second chamber than to the first chamber. It is suggested that the second chamber is pressurized during the entire piston striking sequence. Thereby, an activation of a shut-off valve shortly after the strike, to depressurize the first chamber, will give a very quick response to avoid a following strike.

There is also a desire to improve the control of the energy provided to a work material in HVF and high velocity cutting. An improved energy control may improve the nature of the process in the work material. Doing this may expand the applicability of HVF and high velocity cutting further, e.g. to tasks with even smaller tolerances that those achieved by present HVF and high velocity cutting processes. A further desire is to eliminate the risk for that plunger hits/strikes the tool more than one time for each forming and/or cutting of a product.

SUMMARY

An object of the invention is to improve the control of the energy provided to a work material in material forming and/or cutting, preferably in high velocity forming and high velocity cutting. Another object of the invention is to reduce the plunger driving system capacity need in material forming and/or cutting, preferably in high velocity forming and high velocity cutting. A further object is to be able to provide a work material with smaller tolerances that those achieved by present material forming and/or cutting processes, and preferably in present high velocity and/or cutting processes. Yet a further object is to prevent the plunger to hit/strike the tool more than one time for each forming and/or cutting of a product.

The objects are achieved by a method for material forming and/or cutting, by means of a tool and a drive unit, the method comprising moving the drive unit to provide kinetic energy to the tool, for the tool to strike a work material, so as to form and/or cut the work material, wherein the tool is operatively disassociated from the drive unit before the tool strikes the work material. The risk for rebound is decreased or prevented since the tool is operatively disassociated from the drive unit. This improves properties of the end product, avoiding problems with weakening and unevenness, as well as decreasing the risk for failure in the production. The method is advantageously used for high velocity forming and/or cutting. The method may however also be used for other types of material forming and/or cutting.

That the tool is operatively disassociated from the drive unit may comprise that the tool is separated from the drive unit.

When moving the drive unit comprises accelerating the drive unit, the tool may be in contact with the drive unit during at least a major part of the acceleration of the drive unit and kinetic energy may be provided to the tool. The tool and the drive unit may start accelerating simultaneously. In some embodiments however, the tool may not be in contact with the drive unit during an initial phase of the drive unit acceleration. Instead, the drive unit may come into contact with the tool after the initial phase, the tool remaining in contact with the drive unit during the remainder of the acceleration. For example, the tool may start its acceleration before the drive unit has reached 50%, preferably 20%, more preferably 10% of its maximum velocity. In embodiments where the drive unit contacts the tool after the start of the drive unit acceleration, the drive unit and/or the tool, may be provided with a damper for the contacting of the drive unit to the tool.

In some embodiments, wherein moving the drive unit comprises accelerating the drive unit, the drive unit is a plunger arranged to be driven by a hydraulic system. The plunger may be movably arranged in a cylinder housing. The cylinder housing may be mounted to a frame. The hydraulic system may comprise a first chamber for biasing the plunger towards the workpiece. The hydraulic system may comprise a second chamber for biasing the plunger away from the workpiece. The first and second chambers may be formed by the cylinder housing and the plunger. As detailed below, the second chamber may be provided with system pressure of the hydraulic system during an entire striking process. In alternative embodiments, the plunger may be arranged to be driven in some alternative manner, for example by explosives, by electromagnetism, or by pneumatics.

The energy of the tool may be adjusted by adjusting the velocity and/or mass of the tool. It is understood that a second tool may be present on the opposite side of the work material. The work material may be a workpiece, such as a solid piece of material, e.g. in the form of a sheet, for example in metal. The work material may alternatively be a material in some other form, e.g. on powder form.

The acceleration and velocity of the drive unit can be controlled with a high degree of accuracy. By the tool being in contact with the drive unit during at least a major part of the acceleration of the drive unit, the invention allows for an improved control of the acceleration and the velocity of the tool. Thereby, the invention provides an improved control of the kinetic energy of the tool, and hence the energy provided to the work material.

Embodiments of the invention provides for the drive unit and the tool to be accelerated with the same simultaneous acceleration. Thus, embodiments of the invention involve a considerably slower acceleration of the tool, compared to the movement obtained by processes with a drive unit to tool strike as mentioned above. Thereby, there is no need to consider the risk of excessive deformation of the tool caused by a strike from the drive unit. Therefore, the tool may possess a reduced stiffness, and thereby a reduced mass. In addition, where the drive unit is a plunger it may present a reduced mass, compared to a plunger in a process with a plunger to tool strike. As a result, the capacity of the system for driving the plunger may be reduced.

The tool is operatively disassociated from the drive unit. The tool is arranged to operatively disassociate from the drive unit during a work material striking process involving the movement of the drive unit. The tool is arranged to operatively disassociate from the drive unit, before the tool strikes the work material. For example, where the moving the drive unit comprises accelerating the drive unit, the drive unit may be a plunger that accelerates upwards. The tool may be arranged to rest on top of the plunger, without any fastening elements fixing the tool to the plunger. Thereby, advantageous embodiments exemplified below, are enabled.

Preferably, the drive unit is decelerated, before the tool strikes the work material, so as for the tool to separate from the drive unit before the tool strikes the work material. Thereby, the drive unit may continue towards the work material by means of inertia.

Preferably, the method comprises guiding the tool towards the work material, after the tool has separated from the drive unit. In some embodiments, the path of the tool may be controlled by a guiding arrangement. In some examples, the guiding arrangement comprises a plurality of pins, which are fixed to the tool. However, alternatives are possible. For example, a frame, surrounding the tool, or the path of the tool, may be arranged to guide the tool. Thereby, one or more guiding devices, which are fixed to the tool, may be arranged to engage with the frame while the tool moves along the frame. The guiding of the tool allows an accurate positioning of the tool onto the work material.

The tool may be positioned, before providing kinetic energy to the tool by the movement of the drive unit, at a distance of at least 3 mm from the work material. Preferably the tool is at a distance of at least 5 mm from the work material. Most preferably the tool is at a distance of at least 8 mm from the work material. The preferred positioning of the tool relative the work material can be provided in embodiments where the tool is in contact with the plunger during at least a major part of the acceleration of the plunger as well as in embodiments, exemplified below, where the tool is stationary before providing kinetic energy to the tool by the movement of the drive unit, and moving the drive unit to provide kinetic energy to the tool comprises striking the stationary tool with the drive unit.

The drive unit is preferably decelerated so that the tool does not come into contact with the plunger again, until after the tool has stricken the work material. Thereby, the drive unit does not reach a position in which it will be in contact with the tool, when the tool is in contact with the work material. Thereby, the energy imparted to the work material, for forming the work material, is provided by the tool, without any participation of the drive unit. Thus, the operatively disassociation or the separation may provide for the drive unit being absent at the strike of the work material by the tool. Thereby, problems of known system, such as the risk of one or more repeated strokes by the drive unit, are eliminated.

As suggested, the plunger may be arranged to be driven by a hydraulic system comprising a first chamber for hydraulically biasing the plunger towards the work material. The method may comprise, for the acceleration of the plunger, the hydraulic system being controlled so that hydraulic fluid is moved to the first chamber, wherein, for the plunger deceleration, the hydraulic system is controlled so that the transport of hydraulic fluid towards the first chamber is reduced, but high enough to avoid cavitation of the hydraulic fluid. Thereby, fluid cavitation, which may be harmful to the process, may be effectively avoided.

Preferably, where the plunger is arranged to be driven by a hydraulic system, the method comprising, for the deceleration, allowing a part of the plunger to enter a braking chamber, and allowing thereby hydraulic fluid to be trapped in the braking chamber, whereby an increased pressure in the trapped fluid decelerates the plunger. For example, said part of the plunger may be a waist. Thus, where the plunger is arranged to be driven by a hydraulic system, the plunger may be provided with a waist, the method comprising, for the deceleration, allowing the waist to enter a braking chamber, and allowing thereby hydraulic fluid to be trapped in the braking chamber, whereby an increased pressure in the trapped fluid decelerates the plunger. Where a second chamber for biasing the plunger away from the work material is provided, as suggested above, the braking chamber may be formed at an end of second chamber, in the direction towards the work material.

Preferably, moving the drive unit comprises accelerating the drive unit, and the drive unit is a plunger that is accelerated upwards. Hence, the tool is also accelerated upwards. Thereby, said contact of the tool with the plunger, during at least a major part of the acceleration, may be provided by the tool resting on the plunger. Thereby, the tool may be held by the plunger by gravity, and the acceleration. This simplifies the arrangement for the striking process. It should be noted however, that alternatively the plunger and the tool may be accelerated in another direction, for example downwards, or sideways.

In some embodiments the tool is stationary, and moving the drive unit to provide kinetic energy to the tool comprises striking the stationary tool with the drive unit. The tool may be stationary at distance above the plunger before the plunger strikes the tool.

Where the plunger is accelerated upwards, the method may comprise allowing the tool to fall back onto the plunger after the strike of the work material by the tool. Preferably, the fall of the tool is damped as it approaches the plunger. For this, a damping arrangement may be provided, as exemplified below. This softens the impact when the tool comes into contact with the plunger, which may reduce wear.

The method steps described above may form parts of a work material striking process. Where the plunger is arranged to be driven by a hydraulic system comprising a first chamber for hydraulically biasing the plunger towards the work material, and a valve arrangement for controlling the pressure in the first chamber, the method may comprise receiving signals indicative of one or more of the plunger position, the plunger velocity, the plunger acceleration, the tool position, the tool velocity, the tool acceleration, the pressure in the first chamber, one or more response times of the valve arrangement, the ambient temperature, and a temperature of the hydraulic system oil. The method may further comprise storing at least some of the signals received during at least one work material striking process, and/or storing data provided as a result of processing of at least some of the signals received during at least one work material striking process, and adjusting, for a further striking process, the control of the valve arrangement, based at least partly on the stored signals and/or the stored data. The control of the valve arrangement may also be adjusted based partly on current sensor signals during the further striking process. Thereby the timing of valve actuations during the striking process may be accurate, in view of circumstances such as the temperature and the aging of the apparatus.

According to an embodiment of the invention, the drive unit is a rotating unit comprising a protrusion fixed to a rotor, the protrusion is rotated by rotation of the rotor to provide kinetic energy to the tool.

The objects are also reached with an apparatus for material forming and/or cutting, by means of a tool and a drive unit, the apparatus being arranged to move the drive unit to provide kinetic energy to the tool, for the tool to strike a work material, so as to form or cut the work material, wherein the apparatus is arranged so as for the tool to be operatively disassociated from the drive unit before the tool strikes the work material. Where moving the drive unit comprises accelerating the drive unit, the apparatus may be arranged so as for the tool to be in contact with the drive unit during at least a major part of the Preferably, the apparatus is arranged to decelerate the drive unit, before the tool strikes the work material, so as for the tool to separate from the drive unit. Preferably, a guiding arrangement is arranged to guide the tool towards the work material, after the tool has separated from the drive unit. Preferably, the tool is arranged fixed, before providing kinetic energy to the tool by the movement of the drive unit, and the apparatus is arranged to move the drive unit to provide kinetic energy to the tool and strike the fixed tool with the drive unit. Preferably, when moving the drive unit comprises accelerating the drive unit, the drive unit is a plunger arranged to be driven by a hydraulic system, the apparatus being arranged to allow, for the deceleration, a part of the plunger to enter a braking chamber, and to thereby allow hydraulic fluid to be trapped in the braking chamber. Said part of the plunger may be a waist. Thus, the plunger may be arranged to be driven by a hydraulic system, wherein the plunger is provided with a waist, the apparatus being arranged to allow, for the deceleration, the waist to enter a braking chamber, and to thereby allow hydraulic fluid to be trapped in the braking chamber.

The objects are also achieved by a method for high velocity forming and/or cutting, by means of a tool and a drive unit, the method comprising accelerating the drive unit to provide kinetic energy to the tool, for the tool to strike a work material, so as to form and/or cut the work material, wherein the tool is in contact with the drive unit during at least a major part of the acceleration of the drive unit.

By the tool being in contact with the drive unit during at least a major part of the acceleration of the drive unit, kinetic energy may be provided to the tool. Preferably the tool is in contact with the drive unit during the entire acceleration of the drive unit. Thereby, the tool and the drive unit may start accelerating simultaneously. As suggested, in some embodiments however, the tool may not be in contact with the drive unit during an initial phase of the drive unit acceleration. Instead, the drive unit may come into contact with the tool after the initial phase, the tool remaining in contact with the drive unit during the remainder of the acceleration. As suggested, for example, the tool may start its acceleration before the drive unit has reached 50%, preferably 20%, more preferably 10% of its maximum velocity. In embodiments where the drive unit contacts the tool after the start of the drive unit acceleration, the drive unit and/or the tool, may be provided with a damper for the contacting of the drive unit to the tool.

The drive unit may be a plunger. In some embodiments, the drive unit is arranged to be driven by a hydraulic system. As suggested, the drive unit may be movably arranged in a cylinder housing. The cylinder housing may be mounted to a frame. The hydraulic system may comprise a first chamber for biasing the drive unit towards the workpiece. The hydraulic system may comprise a second chamber for biasing the drive unit away from the workpiece. The first and second chambers may be formed by the cylinder housing and the drive unit. As detailed below, the second chamber may be provided with system pressure of the hydraulic system during an entire striking process. In alternative embodiments, the drive unit may be arranged to be driven in some alternative manner, for example by explosives, by electromagnetism, or by pneumatics.

As suggested, the energy of the tool may be adjusted by adjusting the velocity and/or mass of the tool. It is understood that a second tool may be present on the opposite side of the work material. The work material may be a workpiece, such as a solid piece of material, e.g. in the form of a sheet, for example in metal. The work material may alternatively be a material in some other form, e.g. on powder form.

As suggested, the acceleration and velocity of the drive unit can be controlled with a high degree of accuracy. However, a process with a strike of the tool by the drive unit, as mentioned above, does not provide a full control of the velocity of the tool, and hence its kinetic energy. By the tool being in contact with the drive unit during at least a major part of the acceleration of the drive unit, embodiments of the invention allow for an improved control of the acceleration and the velocity of the tool. Thereby, embodiments of the invention provide an improved control of the kinetic energy of the tool, and hence the energy provided to the work material.

As suggested, embodiments of the invention provide for the drive unit and the tool to be accelerated with the same simultaneous acceleration. Thus, the invention involves a considerably slower acceleration of the tool, compared to the acceleration obtained by processes with a drive unit to tool strike as mentioned above. Thereby, there is no need to consider the risk of excessive deformation of the tool caused by a strike from the drive unit. Therefore, the tool may possess a reduced stiffness, and thereby a reduced mass. In addition, drive unit may present a reduced mass, compared to a drive unit in a process with a drive unit to tool strike. As a result, the capacity of the system for driving the drive unit may be reduced.

In some embodiments, the tool is separable from the drive unit. The tool may be arranged to separate from the drive unit during a work material striking process involving the acceleration of the drive unit. The tool may be arranged to separate from the drive unit, before the tool strikes the work material. For example, where the drive unit accelerates upwards, the tool may be arranged to rest on top of the drive unit, without any fastening elements fixing the tool to the drive unit. Thereby, advantageous embodiments exemplified below, are enabled. However, in some embodiments, the tool may be fixed to the drive unit during the work material striking process. Thereby, the tool may be fixed to the drive unit by one or more releasable fastening elements, for example comprising bolts or similar. In such embodiments, the tool may be fixed to the drive unit when the tool strikes the work material.

As suggested, preferably, the drive unit is decelerated, before the tool strikes the work material, so as for the tool to separate from the drive unit before the tool strikes the work material. Thereby, the drive unit may continue towards the work material by means of inertia.

As suggested, preferably, the method comprises guiding the tool towards the work material, after the tool has separated from the drive unit. In some embodiments, the path of the tool may be controlled by a guiding arrangement. In some examples, the guiding arrangement comprises a plurality of pins, which are fixed to the tool. However, alternatives are possible. For example, a frame, surrounding the tool, or the path of the tool, may be arranged to guide the tool. Thereby, one or more guiding devices, which are fixed to the tool, may be arranged to engage with the frame while the tool moves along the frame. The guiding of the tool allows an accurate positioning of the tool onto the work material.

As suggested, preferably, the drive unit is decelerated so that the tool does not come into contact with the drive unit again, until after the tool has stricken the work material. Preferably, the drive unit does not reach a position in which it will be in contact with the tool, when the tool is in contact with the work material. Thereby, the energy imparted to the work material, for forming the work material, is provided by the tool, without any participation of the drive unit. Thus, the separation may provide for the drive unit being absent at the strike of the work material by the tool. Thereby, problems of known system, such as the risk of one or more repeated strokes by the drive unit, are eliminated.

As suggested, the drive unit may be arranged to be driven by a hydraulic system comprising a first chamber for hydraulically biasing the drive unit towards the work material. The method may comprise, for the acceleration of the drive unit, the hydraulic system being controlled so that hydraulic fluid is moved to the first chamber, wherein, for the drive unit deceleration, the hydraulic system is controlled so that the transport of hydraulic fluid towards the first chamber is reduced, but high enough to avoid cavitation of the hydraulic fluid. Thereby, fluid cavitation, which may be harmful to the process, may be effectively avoided.

As suggested, preferably, where the drive unit is arranged to be driven by a hydraulic system, the method comprises, for the deceleration, allowing a part of the drive unit to enter a braking chamber, and allowing thereby hydraulic fluid to be trapped in the braking chamber, whereby an increased pressure in the trapped fluid decelerates the drive unit. As suggested, for example, said part of the drive unit may be a waist. Thus, where the drive unit is arranged to be driven by a hydraulic system, the drive unit may be provided with a waist, the method comprising, for the deceleration, allowing the waist to enter a braking chamber, and allowing thereby hydraulic fluid to be trapped in the braking chamber, whereby an increased pressure in the trapped fluid decelerates the drive unit. Where a second chamber for biasing the drive unit away from the work material is provided, as suggested above, the braking chamber may be formed at an end of second chamber, in the direction towards the work material.

Preferably, the drive unit is accelerated upwards. As suggested, hence, the tool is also accelerated upwards. Thereby, said contact of the tool with the drive unit, during at least a major part of the acceleration, may be provided by the tool resting on the drive unit. Thereby, the tool may be held by the drive unit by gravity, and the acceleration. This simplifies the arrangement for the striking process. It should be noted however, that alternatively the drive unit and the tool may be accelerated in another direction, for example downwards, or sideways.

As suggested, where the drive unit is accelerated upwards, the method may comprise allowing the tool to fall back onto the drive unit after the strike of the work material by the tool. Preferably, the fall of the tool is damped as it approaches the drive unit. For this, a damping arrangement may be provided, as exemplified below. This softens the impact when the tool comes into contact with the drive unit, which may reduce wear.

As suggested, the method steps described above may form parts of a work material striking process. Where the drive unit is arranged to be driven by a hydraulic system comprising a first chamber for hydraulically biasing the drive unit towards the work material, and a valve arrangement for controlling the pressure in the first chamber, the method may comprise receiving signals indicative of one or more of the drive unit position, the drive unit velocity, the drive unit acceleration, the tool position, the tool velocity, the tool acceleration, the pressure in the first chamber, one or more response times of the valve arrangement, the ambient temperature, and a temperature of the hydraulic system oil. The method may further comprise storing at least some of the signals received during at least one work material striking process, and/or storing data provided as a result of processing of at least some of the signals received during at least one work material striking process, and adjusting, for a further striking process, the control of the valve arrangement, based at least partly on the stored signals and/or the stored data. The control of the valve arrangement may also be adjusted based partly on current sensor signals during the further striking process. Thereby the timing of valve actuations during the striking process may be accurate, in view of circumstances such as the temperature and the aging of the apparatus.

The objects are also reached with a computer program, a computer readable medium, or a control unit. The control unit may be provided as a single physical unit, or as a plurality of units, arranged to communicate with each other.

It should be noted that, although, in some embodiments, the method may be controlled by a control unit, in other embodiments, the method may be controlled mechanically. For example, the method may comprise hydraulically pressurizing a first chamber so as to bias the drive unit towards the work material. The method may further comprise, for a deceleration of the drive unit before the tool strikes the work material, allowing a part of the drive unit to enter a braking chamber, and allowing thereby hydraulic fluid to be trapped in the braking chamber, whereby an increased pressure in the trapped fluid decelerates the drive unit. In such embodiments, the step of controlling the hydraulic system so that the transport of hydraulic fluid towards the first chamber is reduced, may be omitted.

The objects are also reached with an apparatus for high velocity forming and/or cutting, by means of a tool and a drive unit, the apparatus being arranged to accelerate the drive unit to provide kinetic energy to the tool, for the tool to strike a work material, so as to form and/or cut the work material, wherein the apparatus is arranged so as for the tool to be in contact with the drive unit during at least a major part of the acceleration of the drive unit. Advantages with such an apparatus is understood from the description above of embodiments of the method according to the invention. In some embodiments, the tool is separable from the drive unit. The tool may be arranged to separate from the drive unit during a work material striking process involving the acceleration of the drive unit. The tool may be arranged to separate from the drive unit, before the tool strikes the work material. As suggested, the drive unit may be a plunger.

As suggested, preferably, the apparatus is arranged to decelerate the drive unit, before the tool strikes the work material, so as for the tool to separate from the drive unit. Preferably, a guiding arrangement is arranged to guide the tool towards the work material, after the tool has separated from the drive unit. Preferably, the drive unit is arranged to be driven by a hydraulic system, the apparatus being arranged to allow, for the deceleration, a part of the drive unit to enter a braking chamber, and to thereby allow hydraulic fluid to be trapped in the braking chamber. Said part of the drive unit may be a waist. Thus, the drive unit may be arranged to be driven by a hydraulic system, wherein the drive unit is provided with a waist, the apparatus being arranged to allow, for the deceleration, the waist to enter a braking chamber, and to thereby allow hydraulic fluid to be trapped in the braking chamber.

An aspect of the invention provides a method for material forming and/or cutting, by means of a tool and a drive unit, the method comprising operating the drive unit to provide kinetic energy to the tool, for the tool to strike a work material, so as to form and/or cut the work material, wherein that the tool is operatively dis-associated from the drive unit before the tool strikes the work material. The drive unit could be arranged to drive the tool electromagnetically. The drive unit could comprise an electromagnetic spool arranged to provide a magnetic field to drive the tool. Operatively dis-associating the tool from the drive unit could comprise controlling, e.g. disengaging, the electromagnetic spool so as to eliminate the electromagnetic field. In other embodiments, operating the drive unit could comprise moving the drive unit, as exemplified above.

The invention also provides a method for material forming and/or cutting, by means of a tool and a plunger, the method comprising accelerating the plunger to provide kinetic energy to the tool, for the tool to strike a work material, so as to form or cut the work material, wherein said method steps form parts of a work material striking process, wherein the plunger is arranged to be driven by a hydraulic system comprising a first chamber for hydraulically biasing the plunger towards the work material, and a valve arrangement for controlling the pressure in the first chamber, the method comprising receiving signals indicative of one or more of the plunger position, the plunger velocity, the plunger acceleration, the tool position, the tool velocity, the tool acceleration, the pressure in the first chamber, one or more response times of the valve arrangement, the ambient temperature, and a temperature of the hydraulic system oil, the method further comprising storing at least some of the signals received during at least one work material striking process, and/or storing data provided as a result of processing of at least some of the signals received during at least one work material striking process, and adjusting, for a further striking process, the control of the valve arrangement, based at least partly on the stored signals and/or the stored data.

Further advantages and advantageous features of the invention are disclosed in the following description and in the claims.

BRIEF DESCRIPTION OF THE DRAWINGS

Below, embodiments of the invention will be described with reference to the drawings, in which.

DETAILED DESCRIPTION OF EMBODIMENTS OF THE INVENTION

Figure 1:
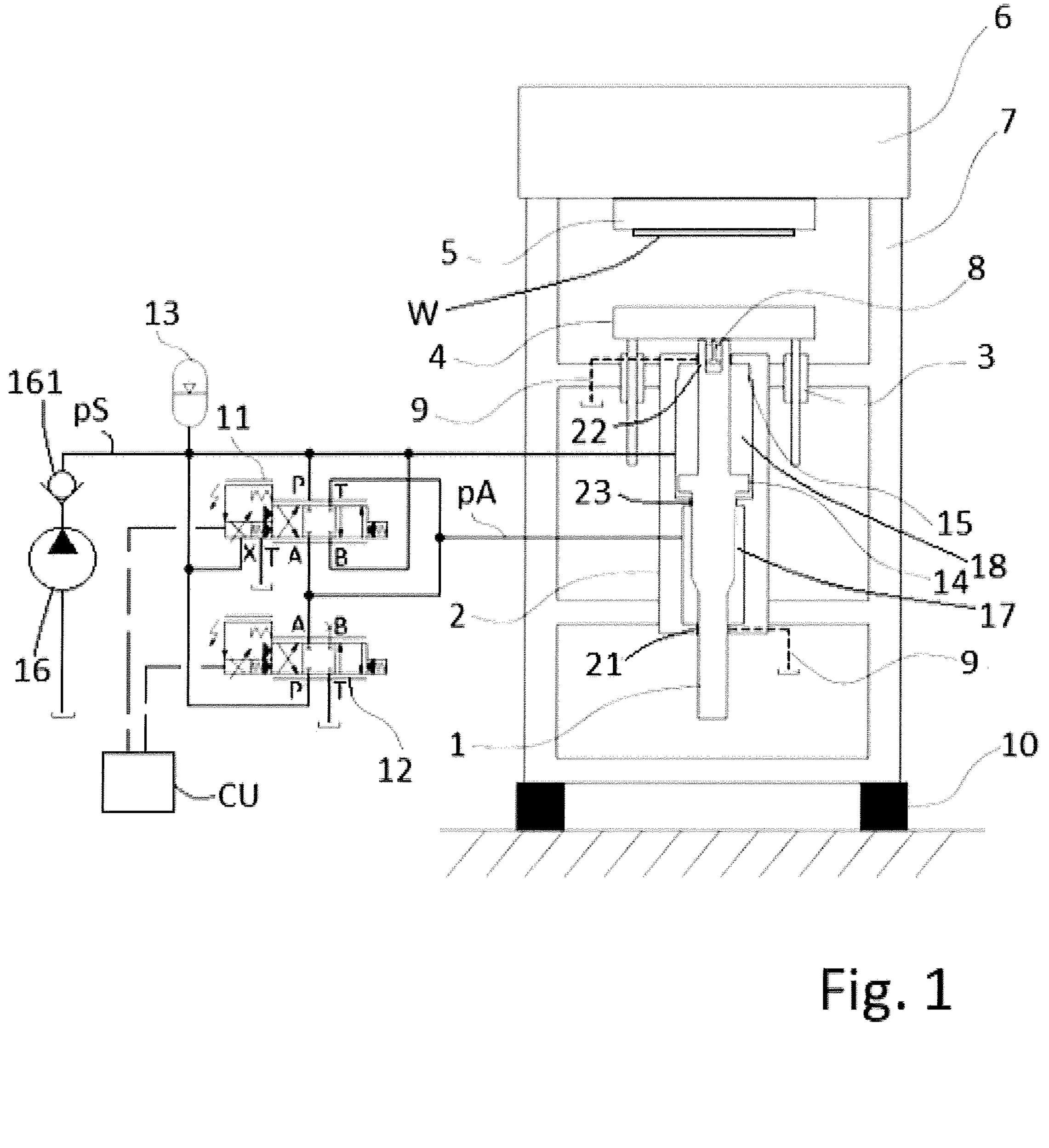
FIG. 1 shows an apparatus for high velocity material forming and/or cutting according to an embodiment of the invention.

FIG. 1 shows an apparatus for high velocity material forming and/or cutting according to an embodiment of the invention. The apparatus comprises a frame 7. The frame is supported by a plurality of support devices 10. An anvil 6 is fixed to the frame. In this embodiment, the anvil 6 is fixed at the top of the frame 7.

A tool, herein referred to as a fixed tool 5, is mounted to the anvil. The fixed tool 5 is mounted to a lower side of the anvil 6. A movable tool 4, described closer below, is located below the fixed tool 5. The tools 4, 5 present complementary surfaces facing each other. A workpiece W is removably mounted to the fixed tool 5. The workpiece W may be mounted to the fixed tool 5 in any suitable manner, e.g. by clamping, or with vacuum. The workpiece W could be of a variety of types, for example a piece of sheet metal. The movable tool 4 is herein also referred to as a first tool. The fixed tool 5 is herein also referred to as a second tool. It should be noted that in some embodiments, also the second tool 5 could be movable.

In the embodiment shown in FIG. 1, a drive assembly comprising a cylinder housing 2 is mounted to the frame 7. Further, the drive assembly comprises a drive unit, hereinafter called plunger 1 that is arranged in the cylinder housing 2. The plunger 1 is elongated, and has, as understood from the description below, a varying width along its longitudinal axis. Preferably, any cross-section of the plunger is circular. The plunger 1 is arranged to move towards and away from the fixed tool 5, as described closer below.

Before providing kinetic energy to the tool 4 by moving or accelerating the drive unit to accelerate the tool, the tool may be positioned at a distance of at least 5 mm from the work material W. Preferably the tool is at a distance of at least 8 mm from the work material W. Most preferably the tool is at a distance of at least 12 mm from the work material W.

The plunger 1 is arranged to be driven by a hydraulic system. The hydraulic system comprises a first chamber 17 for biasing the plunger towards the workpiece, and a second chamber 18 for biasing the plunger away from the workpiece. The first and second chambers are formed by the cylinder housing 2 and the plunger 1. In this example, the workpiece is above the plunger. Thus, in this example, the first chamber 17 is located below the second chamber 18.

The hydraulic system comprises a hydraulic pump 16, for increasing the pressure of a hydraulic fluid in the system, to what is herein referred to as a system pressure pS. The hydraulic system further comprises a non-return valve 161 downstream of the hydraulic pump 16. The second chamber 18 is permanently connected to the system pressure pS. A hydraulic accumulator 13 is arranged to store hydraulic fluid at the system pressure. As understood from the description below, the accumulator 13 is provided to achieve a rapid pressure increase in the first chamber at a plunger acceleration.

The hydraulic system further comprises a valve arrangement. The valve arrangement comprises a first valve 11, and a second valve 12. The first valve 11 is connected to the first chamber 17 as well as to the second chamber 18. Also, the second valve 12 is connected to the first chamber 17 as well as to the second chamber 18. The valve arrangement is controllable by an electronic control unit CU. The valves 11, 12 are arranged to assume positions, so as to provide the steps described below. It is noted here that the valve arrangement 11, 12 can assume a position in which there is no communication between the first and second chambers 17, 18. The valves may be provided with draining devices for end bushing leaks.

At opposite ends, the cylinder housing and the plunger form axial slide bearings 21, 22. Thereby one of said bearings 21 delimits the first chamber 17, and is herein referred to as a first chamber bearing 21. The other of said bearings 22 delimits the second chamber 18, and is herein referred to as a second chamber bearing 22. At each of the first and second bearings 21, 22, draining conduits 9 are provided. An intermediate axial slide bearing 23 is formed, by the cylinder housing and the plunger, between the first and second chambers 17, 18. The bearings 21, 22, 23 allow an axial movement of the plunger 1 in relation to the cylinder housing 2.

The three bearings 21, 22, 23 are circular, as seen in a direction which is parallel to the movement direction of the plunger. Also, the bearings have mutually different diameters. More generally, the bearings have mutually different areas. In other words, circles formed by the circular shape of the bearings have mutually different areas. As a result, the effective areas of the plunger 1 in the first and second chambers differ. In this example, the area A23 of the intermediate bearing 23 is larger than the area A22 of the second bearing 22. In turn, the area A22 of the second bearing 22 is larger than the area A21 of the first bearing 21. Thereby, for balancing the plunger 1 in a static position, with the system pressure pS in the second chamber and an adjusted pressure pA in the first chamber, the adjusted pressure pA has to be such that $$pA^*(A23-A21)=pS^*(A23-A22)+mp^*g$$

where mp is the mass of the plunger and g is the acceleration of gravity.

Figure 2:
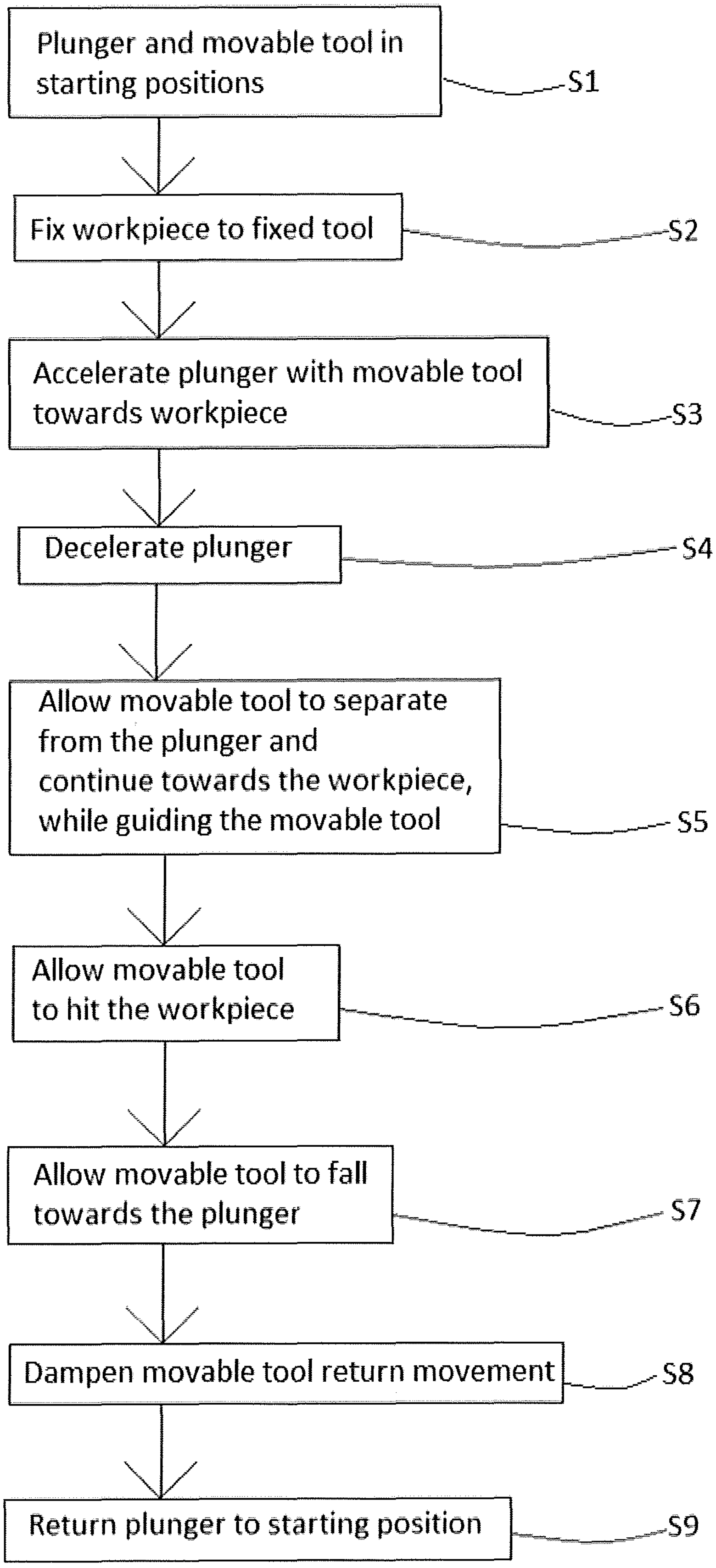
FIG. 2 is a flow diagram, depicting steps in a striking process of the apparatus in FIG. 1

Reference is made also to FIG. 2, depicting steps in a striking process of the apparatus in FIG. 1, involving a strike by the movable tool 4 against the workpiece W and the fixed tool 5.

Before the strike, the movable tool 4 rests S1 on top of the plunger 1. In addition, before the strike, the movable tool 4 is at a distance from the fixed tool 5. Thereby, the plunger 1 and the movable tool 4 are S1 in, what is herein referred to as, respective starting positions.

The first valve 11 is in this example, a 4 way, 3 position valve. Before the strike, the first valve 11 is closed. Also, before the strike, the second chamber 18 is subjected to the system pressure pS. Simultaneously, the second valve 12 is used to control the adjusted pressure pA in the first chamber 17, so as to keep the plunger 1 is a fixed position, as detailed above. The second valve 12 is preferably a proportional valve. It is understood that, to keep the plunger 1 stationary, the adjusted pressure pA of the first chamber 17 may be lower than the system pressure pS. Thereby, the plunger may be kept in its starting position.

The acceleration of the plunger 1 is affected by adjusting the starting position of the plunger 1 and the system pressure pS.

Before the strike by the movable tool 4 is effected, the workpiece W is fixed S2 at the fixed tool 5. It is understood that in the starting position, the movable tool 4 is at a distance from the workpiece W.

When the strike is to commence, the first valve 11 and the second valve 12 are moved to a respective position, in which the respective ports P, with the system pressure pS, is connected with respective ports A, connected to the first chamber 17. Also, in the first valve 11, in said position, port B, with the system pressure pS, is connected to port T, connected to the first chamber 17. As a result, the plunger 1 will accelerate S3, with the movable tool 4, towards the workpiece W. Thereby, hydraulic fluid will flow to the first chamber 17, from the second chamber 18, and from the accumulator 13. Meanwhile, the second chamber 18 is provided with the system pressure pS. A force F moving the plunger can be expressed as $$F = pS^*(A22 - A21) - mp^*g$$

where A21 and A22 are the areas of the first and second bearings 21, 22, respectively, as explained above.

During the acceleration, the movable tool 4 remains resting on the plunger 1. Thereby, the plunger and the movable tool are accelerated with the same, simultaneous acceleration.

Subsequently, the plunger 1 is decelerated S4, or braked. The plunger deceleration is commenced before the movable tool 4 has reached the workpiece W. For the plunger deceleration the first valve 11 is moved to a closed position. Further, for the plunger deceleration, the second valve 12 is controlled so that the transport of hydraulic fluid towards the first chamber 17 is reduced. Thereby, the second valve 12 is controlled so that the transport of hydraulic fluid towards the first chamber 17 is relatively low. However, said control of the second valve 12 is such that transport of hydraulic fluid towards the first chamber 17 is high enough to avoid cavitation of the hydraulic fluid.

During the deceleration, the second chamber 18 remains connected to the system pressure pS. The plunger 1 is provided with a waist 14, which is arranged to enter a braking chamber 15 at an end of the second chamber 18. In this example, the braking chamber 15 is formed at the upper end of the second chamber 18. Thereby, for the plunger deceleration, the waist 14 enters to braking chamber 15. This will trap hydraulic fluid in the braking chamber, and the increased pressure in the trapped fluid will serve to brake the plunger 1. Thereby, the plunger velocity may be reduced to zero.

When the plunger deceleration commences, the movable tool 4 is separated S5 from the plunger 1. The movable tool continues S5, by its inertia, towards the workpiece W. In embodiments of the invention, the velocity of the movable tool 4 at this stage may be for example between 1-20 m/s. The velocity of the movable tool 4 at this stage may for example be above 10 m/s, or even above 12 m/s. The velocity of the movable tool 4 may be selected. The velocity of the movable tool 4 may be selected to optimize the striking process.

The path of the movable tool 4 is controlled S5 by a guiding arrangement 3. In this example, the guiding arrangement comprises a plurality of pins, which are fixed to the movable tool 4. The pins extend from the movable tool and through respective opening in the frame 7.

Subsequently, the movable tool hits S6 the workpiece, and the kinetic energy of the movable tool 4 shapes the workpiece W between the movable tool 4 and the fixed tool 5.

When the shaping of the workpiece is finished, the movable tool 4 will bounce back. It is understood that when the shaping of the workpiece is finished, the movable tool 4 will fall S7 towards the plunger 1. Thereby, the movable tool will be guided by the guiding arrangement 3.

To brake the return movement of the movable tool 4, as it approaches the plunger 1, a damping arrangement 8 is provided. In this example, the damping arrangement comprises a damper mounted to the plunger 1. The damper is mounted at the top end of the plunger. The damper may be of any suitable kind, e.g. hydraulic or pneumatic. Alternatively, or in addition, the damper may comprise an elastic element, such as a plate spring. In some embodiments, the damping arrangement may comprise a damper mounted to the movable tool. In further embodiments, the damping arrangement may comprise a damper mounted to the frame 7. The damping arrangement will effectively brake S8 the return movement of the movable tool. The damping arrangement may also prevent bouncing of the movable tool at the end of its return movement. Thereby, the movable tool 4 may be brought back to rest on the plunger in a controlled manner.

When the plunger 1 has been stopped, the first valve 11 is closed. Thereby, the second chamber is still subjected to the system pressure pS. Simultaneously, the second valve 12 is used to control the adjusted pressure pA in the first chamber 17, so as to move S9 the plunger 1 back to its starting position, from which a subsequent plunger acceleration can be initiated.

In some embodiments, the tool contacts the plunger, after the shaping of the workpiece, and before the plunger is moved S9 back towards its starting position. However, in other embodiments, the plunger 1 may be moved S9 back to its starting position, before the tool contacts the plunger after the shaping of the workpiece. In further embodiments, the plunger 1 may be moved a part of the way towards its starting position, before the tool contacts the plunger after the shaping of the workpiece.

The control unit CU is arranged to receive signals from one or more sensors (not shown). Thereby, the signals received by the control unit CU may be indicative of one or more of the plunger position, the plunger velocity, the plunger acceleration, the movable tool position, the movable tool velocity, the movable tool acceleration, the adjusted pressure pA, the response time(s) of the valve arrangement 11, 12, and the ambient temperature.

The control unit CU is arranged to register and/or process the signals received during at least one striking process, preferably the signals received during a plurality of striking processes, more preferably the signals received during every striking process. The processed, or un-processed signals are stored to form historic striking process data.

The control unit CU is also arranged to adjust for, or during, a striking process, the control of the valve arrangement 11, 12, based on the historic data, and current sensor signals. Thereby the timing of valve actuations during the striking process may be accurate, in view of circumstances such as the temperature and the aging of the apparatus.

It is to be understood that the present invention is not limited to the embodiments described above and illustrated in the drawings; rather, the skilled person will recognize that many changes and modifications may be made within the scope of the appended claims.

Figure 3:
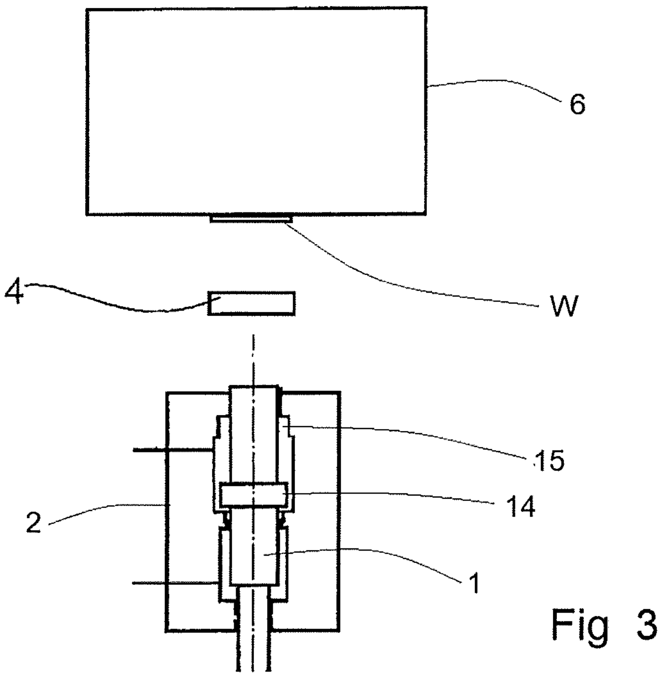
FIG. 3 shows an apparatus for high velocity material forming and/or cutting according to another embodiment of the invention.

FIG. 3 shows an apparatus for high velocity material forming and/or cutting according to another embodiment of the invention. The same reference numerals are used for the corresponding features as shown and described with reference to FIG. 1.

A tool, herein referred to as a fixed tool (not shown), can be mounted to the anvil 6. The fixed tool can be mounted to a lower side of the anvil 6. A movable tool 4, described closer below, is located below the fixed tool. The tools present complementary surfaces facing each other. A workpiece W is removably mounted to the fixed tool. The workpiece W may be mounted to the fixed tool in any suitable manner, e.g. by clamping, or with vacuum. The workpiece W could be of a variety of types, for example a piece of sheet metal. The movable tool 4 is herein also referred to as a first tool. The fixed tool is herein also referred to as a second tool. It should be noted that in some embodiments, also the second tool could be movable.

A drive assembly comprising a cylinder housing 2 is mounted to a frame (not shown). Further, the drive assembly comprises a drive unit, hereinafter called plunger 1, that is arranged in the cylinder housing 2. The plunger 1 is elongated, and has, as understood from the description below, a varying width along its longitudinal axis. Preferably, any cross-section of the plunger is circular. The plunger 1 is arranged to move towards and away from the fixed tool, as described closer below.

Before providing kinetic energy to the tool 4 by moving or accelerating the drive unit to strike the tool, the tool may be positioned at a distance of at least 3 mm from the work material W. Preferably the tool is at a distance of at least 5 mm from the work material W. Most preferably the tool is at a distance of at least 8 mm from the work material W.

The plunger 1 is arranged to be driven by a hydraulic system. Similarly to the embodiment described with reference to FIG. 1, the hydraulic system comprises a first chamber for biasing the plunger towards the workpiece, and a second chamber for biasing the plunger away from the workpiece. The first and second chambers are formed by the cylinder housing 2 and the plunger 1.

The hydraulic system as described above with reference to the embodiment shown in FIG. 1 may be applied for the drive unit shown in FIG. 3.

As the movable plunger is driven towards the workpiece W, the plunger strikes the tool 4.

Similarly to the embodiment in FIG. 1, during the deceleration, the second chamber remains connected to the system pressure. The plunger 1 is provided with a waist 14, which is arranged to enter a braking chamber 15 at an end of the second chamber. Thereby, for the plunger deceleration, the waist 14 enters to braking chamber 15. This will trap hydraulic fluid in the braking chamber, and the increased pressure in the trapped fluid will serve to brake the plunger 1. Thereby, the plunger velocity may be reduced to zero.

The tool 4 may be separated from the plunger 1, when the latter strikes the former. The strike may serve to decelerate the plunger 1. When the plunger deceleration commences, the movable tool 4 is separated from the plunger 1. The movable tool continues, by its inertia, towards the workpiece W.

Similarly to the embodiment in FIG. 1, the path of the movable tool 4 is controlled by a guiding arrangement. The guiding arrangement may comprise a plurality of pins, which are fixed to the movable tool 4. The pins extend from the movable tool and through respective opening in the frame.

The guiding arrangement for controlling the path of the movable tool 4 is not shown in the embodiment shown in FIG. 3. In the embodiment shown in FIG. 3, the tool 4 is arranged stationary, preferably controlled by the mentioned guiding arrangement, before providing kinetic energy to the tool 4 by the movement of the drive unit 1. The apparatus is arranged to move the drive unit 1 to provide kinetic energy to the tool 4 by striking the stationary tool 4 with the drive unit 1.

Figure 4:
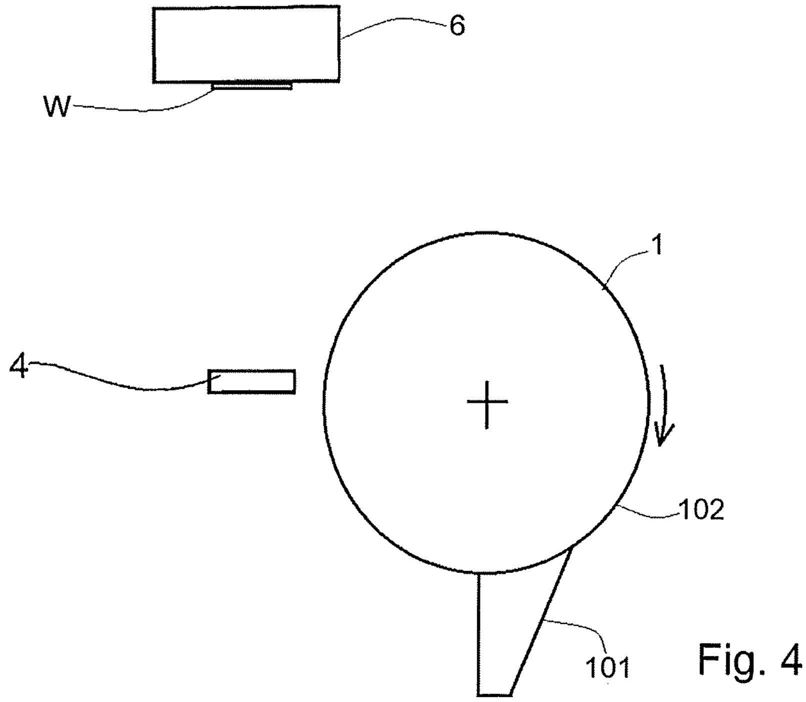
FIG. 4 shows an apparatus for high velocity material forming and/or cutting according to yet another embodiment of the invention.

FIG. 4 shows an apparatus for high velocity material forming and/or cutting according to yet another embodiment of the invention. The same reference numerals are used for the corresponding features as shown and described with reference to FIGS. 1 and 3.

A tool, herein referred to as a fixed tool (not shown), can be mounted to the anvil 6. The fixed tool can be mounted to a lower side of the anvil 6. A movable tool 4, described closer below, is located below the fixed tool. The tools present complementary surfaces facing each other. A workpiece W is removably mounted to the fixed tool. The workpiece W may be mounted to the fixed tool in any suitable manner, e.g. by clamping, or with vacuum. The workpiece W could be of a variety of types, for example a piece of sheet metal. The movable tool 4 is herein also referred to as a first tool. The fixed tool is herein also referred to as a second tool. It should be noted that in some embodiments, also the second tool could be movable.

In the embodiment in FIG. 4, the drive unit is a rotating unit 1 comprising a protrusion 101 fixed to a rotor 102. The protrusion 101 is rotated by rotation of the rotor to provide kinetic energy to the tool 4. In this way the protrusion will strike the tool 4 repeatedly, for each revolution.

A guiding arrangement for controlling the path of the movable tool 4 is not shown in the embodiment shown in FIG. 4, but a similar guiding arrangement as in FIG. 1 can be used. In the embodiment shown in FIG. 4, the tool 4 is arranged stationary, preferably controlled by the mentioned guiding arrangement, before providing kinetic energy to the tool 4 by the movement of the rotating unit 1. The apparatus is arranged to move the rotating unit 1 to provide kinetic energy to the tool 4 by striking the tool 4 with the protrusion projecting from the periphery of the rotating unit 1. When the rotating unit, comprising the protrusion fixed to the rotor, continues its rotation, the movable tool 4 is separated from the protrusion of the rotor. The movable tool 4 continues, by its inertia, towards the workpiece W. Hence, the tool 4 will be operatively disassociated from the rotating unit 1 before the tool 4 strikes the work material W. The tool 4 is brought back to the fixed position, preferably controlled by the mentioned guiding arrangement, when the protrusion is in the position ready to strike the tool again for the next revolution of the rotor. The protrusion will strike the tool 4 repeatedly, for each revolution, until the rotating unit is stopped in a controlled manner.

We claim:

1. A method for material forming and/or cutting, by means of a tool and a plunger, wherein the plunger is arranged to be driven by a hydraulic system comprising a first chamber for hydraulically biasing the plunger towards a work material, the method comprising:

arranging the tool so as to be stationary;

moving hydraulic fluid to the first chamber to accelerate the plunger;

striking the stationary tool with the accelerated plunger to provide kinetic energy to the tool;

decelerating the plunger before the tool strikes the work material, wherein the tool separates from the plunger, (i) by reducing the transport of hydraulic fluid towards the first chamber while avoiding cavitation of the hydraulic fluid, and/or (ii) by making a part of the plunger entering a braking chamber, thereby allowing hydraulic fluid to be trapped in the braking chamber, whereby an increased pressure in the trapped fluid decelerates the plunger; and subsequently striking the work material using the kinetic energy of the tool, whereby the work material is formed and/or cut.

2. The method according to claim 1, comprising guiding the tool towards the work material, after the tool has separated from the plunger.

3. The method according to claim 1, wherein the plunger is decelerated so that the tool does not come into contact with the plunger again, until after the tool has stricken the work material.

4. The method according to claim 1, comprising, before providing kinetic energy to the tool by the acceleration of the plunger, positioning the tool at a distance of at least 3 mm from the work material.

5. A non-transitory computer readable medium carrying a computer program for performing the steps of claim 1 when said computer program is run on a computer.

6. A control unit configured to perform the steps of the method according to claim 1.

7. A method for material forming and/or cutting, by means of a tool and a plunger, wherein the plunger is arranged to be driven by a hydraulic system comprising a first chamber for hydraulically biasing the plunger towards a work material, the method comprising:

moving hydraulic fluid to the first chamber to accelerate the plunger;

wherein the tool is in contact with the plunger during at least a part of the acceleration of the plunger to provide kinetic energy to the tool;

decelerating the plunger before the tool strikes the work material, wherein the tool separates from the plunger, (i) by reducing the transport of hydraulic fluid towards the first chamber while avoiding cavitation of the hydraulic fluid and/or (ii) by making a part of the plunger entering a braking chamber, thereby allowing hydraulic fluid to be trapped in the braking chamber, whereby an increased pressure in the trapped fluid decelerates the plunger, and subsequently striking the work material using the kinetic energy of the tool, whereby the work material is formed and/or cut.

8. The method according to claim 7, comprising guiding the tool towards the work material, after the tool has separated from the plunger.

9. The method according to claim 7, wherein the plunger is decelerated so that the tool does not come into contact with the plunger again, until after the tool has stricken the work material.

10. The method according to claim 7, comprising, before providing kinetic energy to the tool by the acceleration of the plunger, positioning the tool at a distance of at least 3 mm from the work material.

11. A non-transitory computer-readable medium carrying a computer program for performing the steps of claim 7 when the said computer program is run on a computer.

12. A control unit configured to perform the steps of the method according to claim 7.

* * * * *